United States Patent
Maier et al.

(10) Patent No.: US 11,273,816 B2
(45) Date of Patent: Mar. 15, 2022

(54) METHOD AND CONTROL DEVICE FOR CARRYING OUT AN EMERGENCY BRAKING AND/OR PANIC BRAKING OF A VEHICLE

(71) Applicant: Robert Bosch GmbH, Stuttgart (DE)

(72) Inventors: Bernhard Maier, Flein (DE); Friedrich Stelter, Weil der Stadt (DE); Jochen Koretz, Heilbronn (DE); Julian Ewald, Stuttgart (DE); Manfred Gerdes, Vaihingen/Enz (DE); Marko Flinner, Boxberg-Bobstadt (DE); Markus Weigel, Loechgau (DE); Thomas Schmidt, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 16/621,857

(22) PCT Filed: Apr. 12, 2018

(86) PCT No.: PCT/EP2018/059400
§ 371 (c)(1),
(2) Date: Dec. 12, 2019

(87) PCT Pub. No.: WO2018/228734
PCT Pub. Date: Dec. 20, 2018

(65) Prior Publication Data
US 2021/0146903 A1 May 20, 2021

(30) Foreign Application Priority Data
Jun. 12, 2017 (DE) .................... 10 2017 209 892.9

(51) Int. Cl.
*B60T 8/32* (2006.01)
*B60T 13/74* (2006.01)
(Continued)

(52) U.S. Cl.
CPC .......... *B60T 13/745* (2013.01); *B60T 8/3275* (2013.01); *B60T 13/662* (2013.01); *B60T 7/042* (2013.01);
(Continued)

(58) Field of Classification Search
CPC ........ B60T 8/3275; B60T 7/12; B60T 13/745; B60T 2201/03
See application file for complete search history.

(56) References Cited

U.S. PATENT DOCUMENTS

| | | | |
|---|---|---|---|
| 2009/0039702 A1 | 2/2009 | Nishino et al. |
| 2009/0045672 A1 | 2/2009 | Nishino et al. |

FOREIGN PATENT DOCUMENTS

| | | |
|---|---|---|
| CN | 102320292 A | 1/2012 |
| CN | 104793039 A | 7/2015 |

(Continued)

OTHER PUBLICATIONS

International Search Report dated Jul. 10, 2018 of the corresponding International Application PCT/EP2018/059400 filed Apr. 12, 2018.

*Primary Examiner* — Bradley T King
(74) *Attorney, Agent, or Firm* — Norton Rose Fulbright US LLP; Gerard Messina

(57) ABSTRACT

In a method, which can be performed by a control device for carrying out an emergency braking and/or panic braking of a vehicle, in a first phase, a setpoint vehicle deceleration requested instantaneously by a driver is ignored and a motor of an electromechanical brake booster is operated in a predefined high power mode such that a main brake cylinder pressure in the main brake cylinder is increased; in an intermediate phase, the main brake cylinder pressure is reduced to a setpoint pressure by pumping brake fluid from the main brake cylinder into the at least one wheel brake cylinder and the motor force of the motor is reduced to a setpoint force; and the brake pressure increase in the at least (Continued)

one wheel brake cylinder is continued during a second phase only if the driver requests instantaneously a setpoint vehicle deceleration.

15 Claims, 5 Drawing Sheets

(51) Int. Cl.
  *B60T 13/66* (2006.01)
  *B60T 7/04* (2006.01)
  *B60T 17/18* (2006.01)

(52) U.S. Cl.
  CPC ......... *B60T 17/18* (2013.01); *B60T 2201/022* (2013.01); *B60T 2201/03* (2013.01); *B60Y 2400/81* (2013.01)

(56) References Cited

FOREIGN PATENT DOCUMENTS

| | | |
|---|---|---|
| DE | 102012202006 A1 | 8/2013 |
| EP | 1172272 A1 | 1/2002 |
| EP | 2630015 B1 | 10/2016 |
| WO | 0010854 A1 | 3/2000 |

METHOD AND CONTROL DEVICE FOR CARRYING OUT AN EMERGENCY BRAKING AND/OR PANIC BRAKING OF A VEHICLE

CROSS-REFERENCE TO RELATED APPLICATIONS

The present application is the national stage of International Pat. App. No. PCT/EP2018/059400 filed Apr. 12, 2018, and claims priority under 35 U.S.C. § 119 to DE 10 2017 209 892.9, filed in the Federal Republic of Germany on Jun. 12, 2017, the content of each of which are incorporated herein by reference in their entireties.

FIELD OF THE INVENTION

The present invention relates to a method for carrying out an emergency braking and/or panic braking of a vehicle. The present invention also relates to a control device for a braking system of a vehicle and to a braking system for a vehicle.

BACKGROUND

An assistance function known as a hydraulic braking assistant (HBA) is known from the related art, using which a brake pressure increase in at least one wheel brake cylinder of the braking system is to be achievable using at least one pump of a braking system of the vehicle automatically and temporarily independent of a pedal actuation of a driver of the vehicle during an emergency braking or panic braking of a vehicle. In this way a shorter braking distance of the vehicle until it is stopped is to be achievable.

FIG. 1 shows a functional diagram of a conventional hydraulic braking assistant, as described, for example, in EP 2 630 015 B.

In an emergency braking and/or panic braking of a vehicle schematically reproduced using FIG. 1, which is triggered at a point in time t1, at least one pump BSC of a braking system of the vehicle (as at least one braking system component BSC) is operated in a high power mode during a first phase P1 of the emergency braking and/or panic braking, so that a rapid brake pressure increase is effectuated in at least one wheel brake cylinder of the braking system. It is expressly noted that during the first phase P1, a setpoint vehicle deceleration $a_0$ requested instantaneously by a driver of the vehicle is not taken into consideration when activating the at least one pump BSC. (The arrow for the setpoint vehicle deceleration $a_0$ is therefore "missing" for the first phase P1 in FIG. 1).

In order to give the driver (after effectuating the rapid brake pressure increase in at least one wheel brake cylinder of the braking system) another opportunity to influence an instantaneous deceleration of the vehicle, a second phase P2 of the emergency braking and/or panic braking is carried out after a point in time t2. During the second phase P2, the at least one pump BSC is operated taking the setpoint vehicle deceleration $a_0$ requested instantaneously by the driver of the vehicle into consideration, so that during the second phase P2, a deceleration of the vehicle is effectuated using at least one pump BSC according to the instantaneously requested setpoint vehicle deceleration $a_0$ or according to a function of the instantaneously requested setpoint vehicle deceleration $a_0$.

As is visually represented using an arrow 2 in FIG. 1, the two phases P1 and P2 can be repeated arbitrarily often at a point in time t3 after a discontinuation/termination of the emergency braking and/or panic braking. In addition, it is visually represented using a solid (uninterrupted) line 4 between the times t1 through t3 in FIG. 1 that in both phases P1 and P2, only the at least one pump BSC of the braking system is used for effectuating braking pressure increases in the at least one wheel brake cylinder of the braking system.

SUMMARY

The present invention provides a method for carrying out an emergency braking and/or panic braking of a vehicle, a control device for a braking system of a vehicle, and a braking system for a vehicle.

The present invention provides opportunities for utilizing an electromechanical brake booster during a first phase/initial phase of an emergency braking and/or panic braking. Thus, the generally significantly higher pressure build-up dynamic of the electromechanical brake booster can be utilized for rapidly decelerating a vehicle using the present invention compared to a pump/hydraulic pump of a braking system. A conventional limitation of a pressure build-up achievable in the at least one wheel brake cylinder of the braking system within the first phase of the emergency braking and/or panic braking to a maximally conveyable volume flow using the at least one pump of the braking system is also eliminated. It is also noted that an ascertainment of a correct value for a setpoint vehicle deceleration requested instantaneously by the driver of the vehicle during the chronologically limited first phase of the emergency braking and/or panic braking can be dispensed with, and therefore the impact of the operation of the electromechanical brake booster during the first phase of the emergency braking and/or panic braking on an input rod travel of an input rod and on a differential travel between the input rod and a valve body of the electromechanical brake booster results in no disadvantages of any kind.

Another advantage of the present invention is that the at least one pump (instead of the electromechanical brake booster) is used to increase the deceleration of the vehicle during a second phase of the emergency braking and/or panic braking carried out after the first phase. Thus, after carrying out the intermediate phase using an ascertainment/measurement of the input rod travel and/or of the differential travel, it can be reliably detected/established whether the driver desires an additional continuing deceleration of the vehicle. The input rod travel and the differential travel are not impeded by the operation of the at least one pump in the second phase of the emergency braking and/or panic braking and can thus be used as an indicator/as indicators for an instantaneous request for a (non-zero) setpoint vehicle deceleration by the driver during the potentially implemented active boosting using the at least one pump in the second phase.

The present invention thus provides a combination of advantages of the electromechanical brake booster and of the at least one pump of the braking system. The comparatively high dynamic of the electromechanical brake booster can be utilized specifically for an initial brake pressure increase in the first phase/initial phase of the emergency braking and/or panic braking. It is in particular at such a point in time that a high pressure build-up dynamic is desired. The advantageous property can also be utilized in such a way that the operation of the at least one pump in the second phase of the emergency braking and/or panic braking for increasing the deceleration of the vehicle has no impact on the input rod travel and on the differential travel, and thus the input rod travel and the differential travel in the second phase of the emergency braking and/or panic braking can be evaluated for a reliable sensing for an instantaneous request by the driver for a (non-zero) setpoint vehicle deceleration. In addition, the pressure build-up dynamic of the at least one pump in the second phase of the emergency braking and/or panic braking is generally sufficient for increasing the deceleration of the vehicle.

It is also noted that the present invention is usable for a multitude of various vehicle types without the respective vehicles having to be equipped with new braking system components. An implementation of the present invention is therefore relatively cost-effective and requires no additional installation space in a vehicle.

In an example embodiment of the method for carrying out an emergency braking and/or panic braking of a vehicle, it is ascertained during the second phase of the emergency braking and/or panic braking whether the driver requests instantaneously a (non-zero) setpoint vehicle deceleration by ascertaining an input rod travel of an input rod of the electromechanical brake booster and/or a differential travel between the input rod and a valve body of the electromechanical brake booster. As is already explained above, the operation of the at least one pump during the second phase of the emergency braking and/or panic braking has no impact on the input rod travel and on the differential travel. Thus, in the example embodiment of the method described here, it can be reliably ascertained whether the driver requests instantaneously a (non-zero) setpoint vehicle deceleration.

In addition, the electromechanical brake booster can be operated during the second phase of the emergency braking and/or panic braking in such a way that the differential travel between the input rod and the valve body can be set equal to a predefined setpoint differential travel using the electromechanical brake booster. The driver therefore has a standard/pleasant brake actuation feel (pedal feel) during the second phase of the emergency braking and/or panic braking.

In addition, at least one switch valve of the braking system can be closed between the first phase and the intermediate phase. As a result, the braking pressure in the at least one wheel brake cylinder can be increased significantly above the main brake cylinder pressure present in the main brake cylinder.

If desired, the at least one pump can also be operated in a pumping mode predefined for the first phase during the first phase of the emergency braking and/or panic braking, in order to effectuate an additional braking pressure increase in the at least one wheel brake cylinder using the at least one pump operating in the pumping mode. This can contribute to the additional reduction of the braking distance of the vehicle decelerated using the emergency braking and/or panic braking.

A main brake cylinder pressure present in the main brake cylinder is established, for example, as a setpoint pressure immediately before the start of the emergency braking and/or panic braking and/or a motor force exerted using the motor of the electromechanical brake booster immediately before the start of the emergency braking and/or panic braking is established as a setpoint force. This is easily implementable.

The motor of the electromechanical brake booster operated in its high power mode preferably demands its maximum power during the first phase. This effectuates a brake pressure increase in the at least one wheel brake cylinder of the braking system having a comparatively high gradient, and thus a significant reduction of a braking distance of the vehicle decelerated using the emergency braking and/or panic braking.

The first phase of the emergency braking and/or panic braking preferably continues until an output rod travel of an output rod of the electromechanical brake booster is greater than or equal to a predefined maximum output rod travel, until at least one braking pressure in the at least one wheel brake cylinder is greater than or equal to at least one predefined maximum braking pressure, until the main brake cylinder pressure in the main brake cylinder is equal to a predefined maximum main brake cylinder pressure, until the deceleration of the vehicle is greater than or equal to a predefined maximum deceleration, or until a predefined maximum period of time of the first phase is exceeded. All the example embodiments cited here prevent an over-braking of the vehicle.

The emergency braking and/or panic braking of the vehicle is/are carried out, for example, if an actuation speed of an actuation of a brake actuation element of the vehicle by the driver is outside a predefined normal value range for specifying the instantaneously requested setpoint vehicle deceleration and/or a vehicle state sensor system and/or surroundings detection sensor system of the vehicle request the emergency braking and/or panic braking. Thus, it is possible to respond specifically to such situations using the method described herein, in which the driver fears an accident and therefore actuates his/her brake actuation element comparatively quickly or in which the vehicle state sensor system and/or surroundings detection sensor system of the vehicle detect(s) an accident risk due to a state of the vehicle and/or on a surroundings condition.

The preceding described advantages are also ensured by a corresponding control device for a braking system of a vehicle. It is noted that the control device can be developed further in accordance with the above described example embodiments of the method.

In addition, a corresponding braking system for a vehicle including such a control device, the electromechanical brake booster, and the at least one pump also yields the above described advantages. The braking system can also be developed further in accordance with the above described example embodiments of the method for carrying out an emergency braking and/or panic braking of a vehicle.

Additional features and advantages of the present invention are explained below with reference to the figures.

DETAILED DESCRIPTION

FIGS. 2a-2d show functional diagrams of an example embodiment of the method for carrying out an emergency braking and/or panic braking of a vehicle.

The method described below can be utilized for decelerating any vehicle/motor vehicle, which is equipped with at least one electromechanical brake booster (upstream from a main brake cylinder of its braking system) and at least one pump/hydraulic pump. The electromechanical brake booster can be understood to mean, in particular, an iBooster. At least one return pump, in particular, can be used as the at least one pump. The braking system preferably also includes at least one switch valve, with the closing of which a brake fluid transfer from at least one connected wheel brake cylinder into the main brake cylinder of the braking system itself is preventable even if a braking pressure p in the respective wheel brake cylinder is above a main brake cylinder pressure $p_{TMC}$ in the main brake cylinder. (However, a brake fluid transfer/pumping of brake fluid from the main brake cylinder into the at least one connected wheel brake cylinder itself via one return valve each situated in parallel to the at least one switch valve is still possible after a closing of the at least one switch valve.) Thus, an implementation of the method described below places no special demands on the vehicle/motor vehicle decelerated using the implemented emergency braking and/or panic braking or on its braking system.

Figure 1:
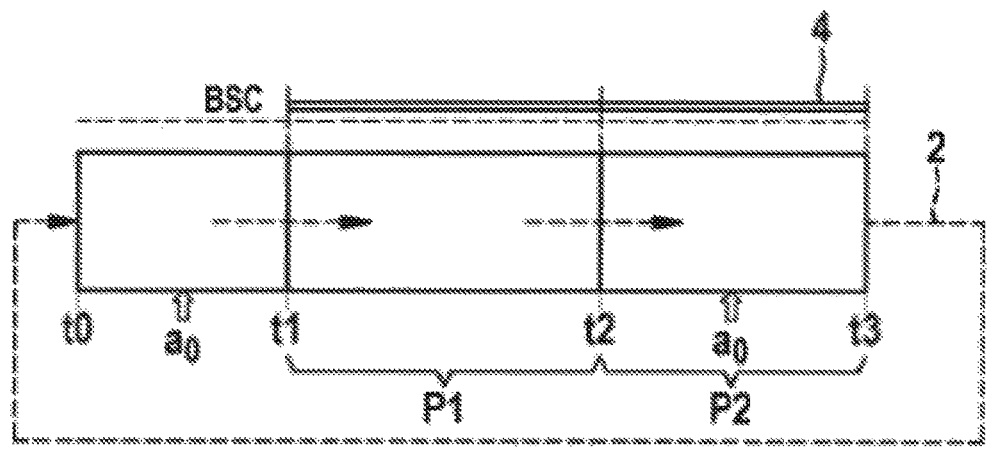
FIG. 1 shows a functional diagram of a conventional hydraulic braking assistant.
Figure 2A:
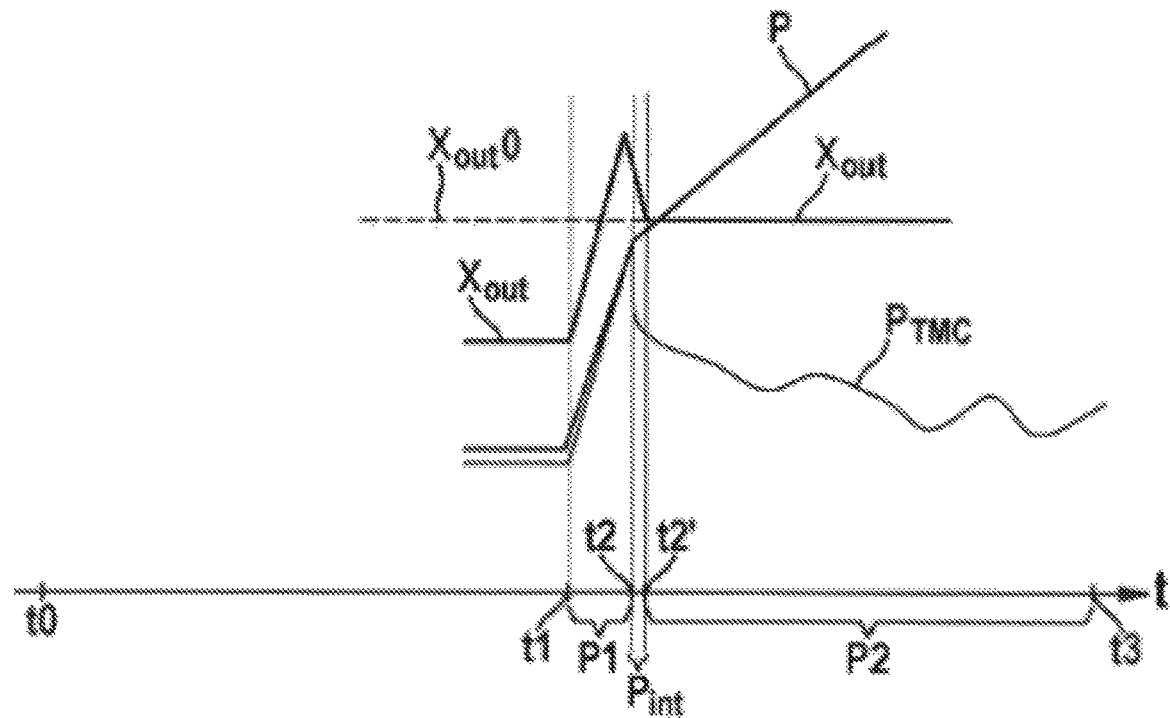
FIGS. 2a-2d show functional diagrams of a method for carrying out an emergency braking and/or panic braking of a vehicle according to an example embodiment of the present invention.

FIG. 2a shows a coordinate system, the x-axis of which is a time axis t. Braking pressure p in the wheel brake cylinders, main brake cylinder pressure $p_{TMC}$ in the main brake cylinder, and an output rod travel $x_{out}$ of the electromechanical brake booster are specified using a y-axis of the coordinate system of FIG. 2a.

The emergency braking and/or panic braking of the vehicle is/are triggered/started at a point in time t1. The emergency braking and/or panic braking of the vehicle is/are carried out, for example, if an actuation speed of an actuation of a brake actuation element of the vehicle (such as, for example, an actuation of a brake pedal) by a driver of the vehicle is outside a predefined normal value range for specifying a setpoint vehicle deceleration requested instantaneously by the driver. Thus, it is possible, specifically in situations in which the driver fears an accident and therefore "hurriedly" actuates the brake actuation element, to bring the vehicle comparatively quickly to a stop using the implementation of the emergency braking and/or panic braking described below.

Alternatively or in addition, the emergency braking and/or panic braking of the vehicle described below can also be carried out if this is requested by a vehicle state sensor system and/or a surroundings detection sensor system of the vehicle. The vehicle state sensor system and/or surroundings detection sensor system can include at least one vehicle state sensor for ascertaining a state/a functional impairment of at least one vehicle component of the vehicle and/or at least one surroundings detection sensor for detecting the surroundings of the vehicle. The emergency braking and/or panic braking of the vehicle described below can, for example, be requested by the vehicle state sensor system and/or by the surroundings detection sensor system if an imminent malfunction of at least one vehicle electrical system of the vehicle and/or an obstacle in the driving direction of the vehicle is detected by the vehicle state sensor system and/or the surroundings detection sensor system. The emergency braking and/or panic braking described below can thus contribute to the reduction of an accident risk in a multitude of situations.

Figure 2B:
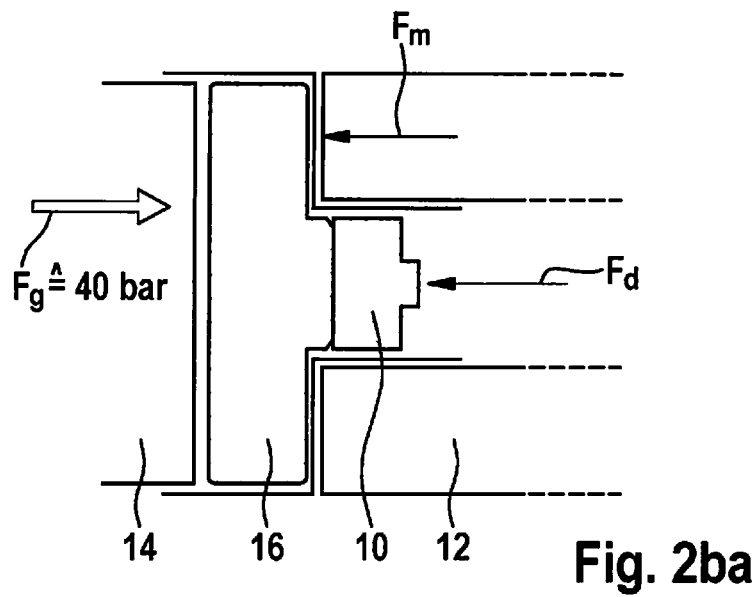
Figure 2B:
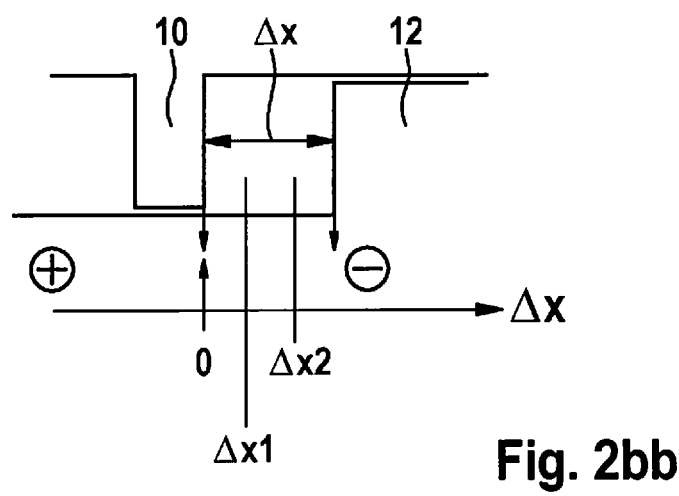

In the example of FIG. 2a, the driver actuates the brake actuation element of the vehicle as of a point in time t0, it being detected (only) just before time t1 that the actuation speed of the actuation of the brake actuation element is outside the predefined normal value range. Between times t0 and t1, the electromechanical brake booster is used to set a differential travel Δx between an input rod 10 of the electromechanical brake booster and a valve body 12 (valve body, boost body) of the electromechanical brake booster equal to a setpoint differential travel. FIGS. 2ba and 2bb schematically show representations/functional diagrams of the electromechanical brake booster during times t0 and t1, only a pastille of input rod 10 being reproduced. It is apparent that using the operation of the electromechanical brake booster, a driver braking force $F_d$ of the driver (exerted on the brake actuation element/brake pedal) is increased by a motor force $F_m$ of a motor of the electromechanical brake booster, so that a sum of forces $F_d$ and $F_m$ acts on an output rod 14 of the electromechanical brake booster. This produces, for example, a main brake cylinder pressure $p_{TMC}$ in the main brake cylinder of 40 bar and a corresponding pressure force $F_g$ in the main brake cylinder, which counteracts a braking movement of output rod 14. In such an operation of the electromechanical brake booster, however, a (significant) deformation of a reaction disk 16 of the electromechanical brake booster need not be feared. An input rod travel of the input rod is therefore easily and reliably ascertainable/measurable (using a corresponding input rod travel sensor), and is evaluatable with respect to the setpoint vehicle deceleration requested instantaneously by the driver of the vehicle (using an actuation of his/her brake pedal). The differential travel Δx between input rod 10 and valve body 12 is also easily and reliably ascertainable/measurable (using a corresponding differential travel sensor). (A first differential travel Δx1 for an engaged brake pedal and a second differential travel Δx2 for a released brake pedal are indicated by way of example in FIG. 2bb.)

The emergency braking and/or panic braking of the vehicle is/are started as of point in time t1. In the emergency braking and/or panic braking carried out using the method described herein, the emergency braking and/or panic braking, which extend(s) from point in time t1 to a point in time t2 during a first phase P1, (intentionally) ignore(s)/do (does) not consider the setpoint vehicle deceleration requested instantaneously by the driver of the vehicle. For example, the input rod travel of the input rod 10 of the electromechanical brake booster and/or the differential travel Δx between the input rod 10 and the valve body 12 (intentionally) are ignored/not considered. In addition, the electromechanical brake booster is operated during first phase P1 in a high power mode predefined for the first phase in such a way that the main brake cylinder pressure $p_{TMC}$ in the main brake cylinder is (significantly) increased using the increased motor force $F_m$ of the motor of the electromechanical brake booster operated in the high power mode and, in this way, a (strong) brake pressure increase is effectuated in the at least one wheel brake cylinder of the braking system. (The at least one wheel brake cylinder of the braking system is connected to the main brake cylinder during first phase P1 in such a way that a brake fluid transfer from the main brake cylinder into the at least one wheel brake cylinder is triggerable using the electromechanical brake booster.) During first phase P1, the electromechanical brake booster is activated and operated separately from the setpoint vehicle deceleration requested instantaneously by the driver.

Thus, during first phase P1, a strong, but "unmeasured" deceleration of the vehicle (for example, an "unmeasured" full deceleration of the vehicle) is effectuated using the electromechanical brake booster. As a result, a weakness of many drivers is compensated for, who "hurriedly" actuate their brake actuation element/brake pedal after recognizing an emergency braking situation (between times t0 and t1), but hesitate thereafter to request a setpoint vehicle deceleration appropriate to the emergency braking situation.

Many drivers, in particular, hesitate after an initial moment of shock (between times t0 and t1), which triggers the "hurried" actuation of the brake actuating element, thus, to consequently request a full deceleration of their vehicle. However, using the operation of the electromechanical brake booster in the predefined high power mode, a significant vehicle deceleration is effectuated in first phase P1, so that the initial hesitation of the driver (recognizing the emergency braking situation but not yet responding appropriately) when requesting a setpoint deceleration of the vehicle is bridged. The electromechanical brake booster, in particular, effectuates the brake pressure increase in the at least one wheel brake cylinder triggering a rapid deceleration of the vehicle generally already during first phase P1 of the emergency braking and/or panic braking. (Thus, the electromechanical brake booster is not used during first phase P1 for the force-related assistance of the driver when actuating the brake actuation element.)

The use/application of the electromechanical brake booster (instead of or in addition to the at least one pump of the braking system) increases significantly a pressure build-up dynamic of the brake pressure increase in the at least one wheel brake cylinder. The electromechanical brake booster exhibits a higher dynamic compared to the at least one pump of the braking system, and is thus advantageously suited for significantly increasing the pressure build-up dynamic during first phase P1.

Above all, the braking distance of the vehicle until it is stopped can be shortened as a result of the use/application of the electromechanical brake booster (instead of or in addition to the at least one pump of the braking system) for effectuating the dynamic brake pressure increase in the at least one wheel brake cylinder.

First phase P1 can be described as a full deceleration phase of the emergency braking and/or panic braking. The high power mode predefined for first phase P1, in which the electromechanical brake booster is operated during first phase P1 of the emergency braking and/or panic braking, can be understood to mean an operating mode of the electromechanical brake booster, in which a higher power is requested than during a "normal operation" of the electromechanical brake booster. The electromechanical brake booster is used, for example, during its "normal operation" to set the predefined setpoint differential travel between input rod 10 and valve body 12, requested powers of the electromechanical brake booster during its "normal operation" being in a normal value power range. In this case, the power requested by the electromechanical brake booster operated in the high power mode can be above/outside the normal value power range. The high power mode of the electromechanical brake booster is preferably sufficient for effectuating a brake pressure p in the at least one wheel brake cylinder triggering a full braking of the vehicle. The maximum power of the electromechanical brake booster can, in particular, be requested by the motor of the electromechanical brake booster operated in its high power mode.

If the braking system includes the at least one switch valve, via which the at least one wheel brake cylinder of the braking system is connected to the main brake cylinder, the at least one switch valve is controlled in its open state during first phase P1. If the braking system has the at least one switch valve, brake fluid is transferred during first phase P1 using the operation of the electromechanical brake booster in the high power mode from the main brake cylinder via the at least one open switch valve into the at least one wheel brake cylinder.

Figure 2C:
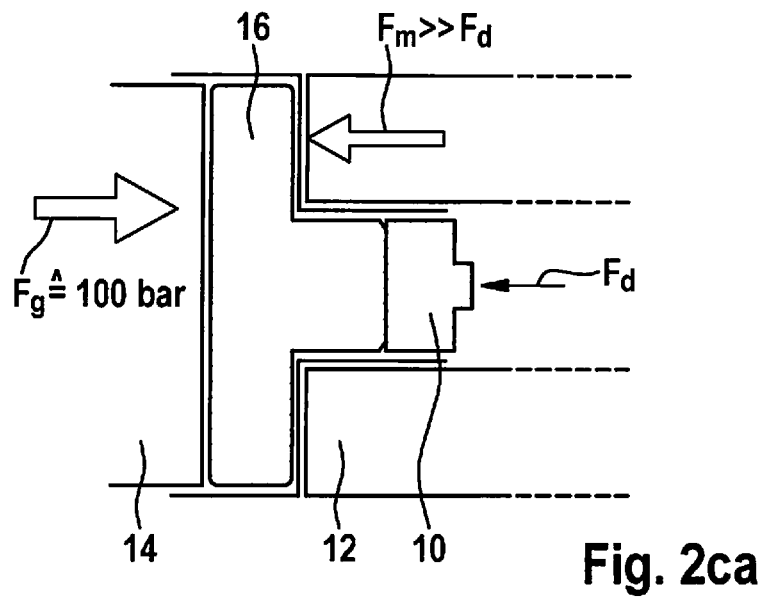
Figure 2C:
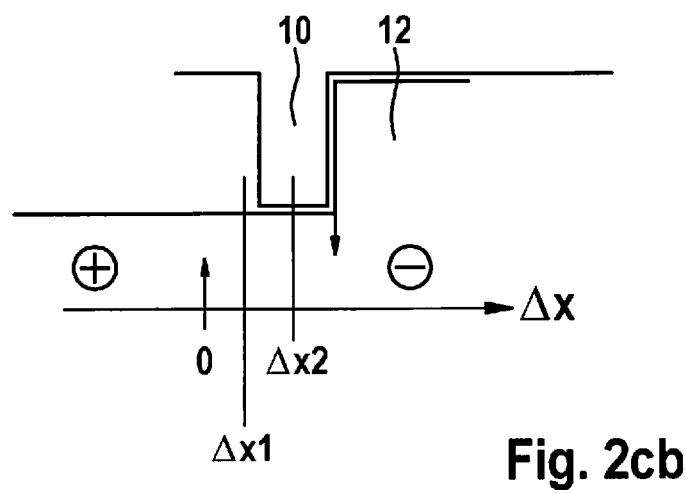

FIGS. 2ca and 2cb schematically show representations/functional diagrams of the electromechanical brake booster during first phase P1. Motor force $F_m$ of the motor of the electromechanical brake booster is significantly greater during first phase P1 than driver braking force $F_d$ of the driver. This effectuates a significant increase of the main brake cylinder pressure $P_{TMC}$ in the main brake cylinder, for example, to 100 bar. Since driver braking force $F_d$ of the driver no longer sufficiently supports reaction disk 16 of the electromechanical brake booster with respect to motor force $F_m$ of the motor of the electromechanical brake booster and pressure force $F_g$, reaction disk 16 is severely deformed and "pushed back" against input rod 10. Thus, an input rod travel ascertainable on input rod 10 is no longer suitable as a parameter for detecting/determining an instantaneous required request for a (non-zero) setpoint vehicle deceleration by the driver. This has no impact during first phase P1, however, since first phase P1 of the emergency braking and/or panic braking requires no knowledge whatsoever about an instantaneous request of a (non-zero) setpoint vehicle deceleration by the driver.

The at least one pump of the braking system can be inactive during first phase P1 of the emergency braking and/or panic braking. Alternatively, however, the at least one pump of the braking system can also be operated during first phase P1 in a pumping mode predefined for first phase P1, in order to effectuate an additional brake pressure increase in the at least one wheel brake cylinder using the at least one pump operated in the pumping mode.

First phase P1 of the emergency braking and/or panic braking lasts (only) until output rod travel $x_{out}$ of output rod 14 of the electromechanical brake booster (indicated in FIG. 2a) is greater than or equal to a predefined maximum output rod travel $x_{out0}$, until the at least one (instantaneous) brake pressure p in the at least one wheel brake cylinder is greater than or equal to at least one predefined maximum brake pressure, until main brake cylinder pressure $p_{TMC}$ in the main brake cylinder is equal to a predefined maximum main brake cylinder pressure, until a (instantaneous) deceleration of the vehicle is greater than or equal to a predefined maximum deceleration, or until a predefined maximum time of first phase P1 is exceeded. This prevents an over-braking of the vehicle. First phase P1 of the emergency braking and/or panic braking can last, for example, approximately 200 ms (milliseconds).

An intermediate phase $P_{int}$ is carried out (between times t2 and t2') between first phase P1/full deceleration phase of the emergency braking and/or panic braking and a second phase P2/measuring phase of the emergency braking and/or panic braking. If the braking system includes the at least one switch valve, via which the at least one wheel brake cylinder of the braking system is connected to the main brake cylinder, the at least one switch valve of the braking system is closed between first phase P1 and intermediate phase $P_{int}$. In intermediate phase $P_{int}$ of the emergency braking and/or panic braking, the main brake cylinder pressure $p_{TMC}$ is reduced to a predefined or established setpoint pressure by pumping brake fluid from the main brake cylinder into the at least one wheel brake cylinder using the at least one pump of the braking system. (This generally effectuates an additional increase of brake pressure in the at least one wheel brake cylinder.) In addition, motor force $F_m$ of the motor of the electromechanical brake booster is reduced in intermediate phase $P_{int}$ to a predefined or established setpoint force. For example, a main brake cylinder pressure $p_{TMC}$ present in the main brake cylinder is established as a setpoint pressure immediately before the start of the emergency braking and/or panic braking and/or a motor force $F_m$ exerted using the motor of the electromechanical brake booster is established as a setpoint force immediately before the start of the emergency braking and/or panic braking. The setpoint pressure and/or the setpoint force can also be (permanently) predefined.

Figure 2D:
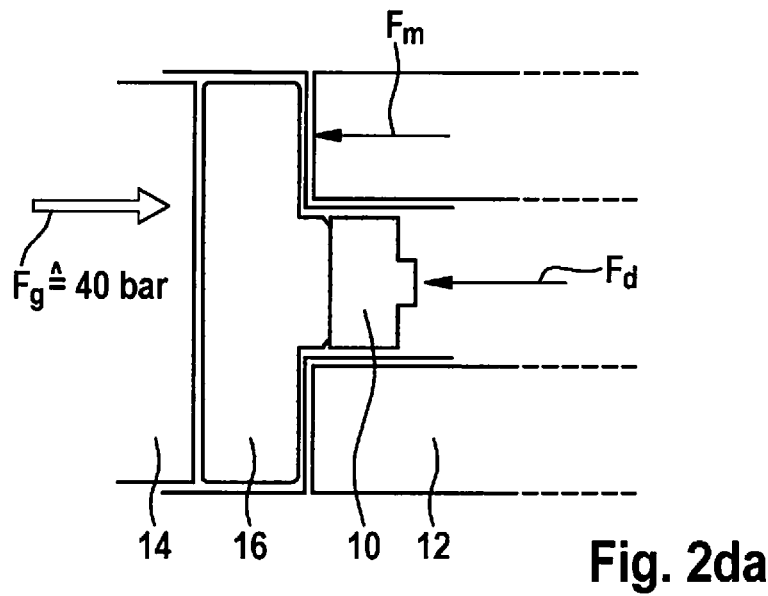
Figure 2D:
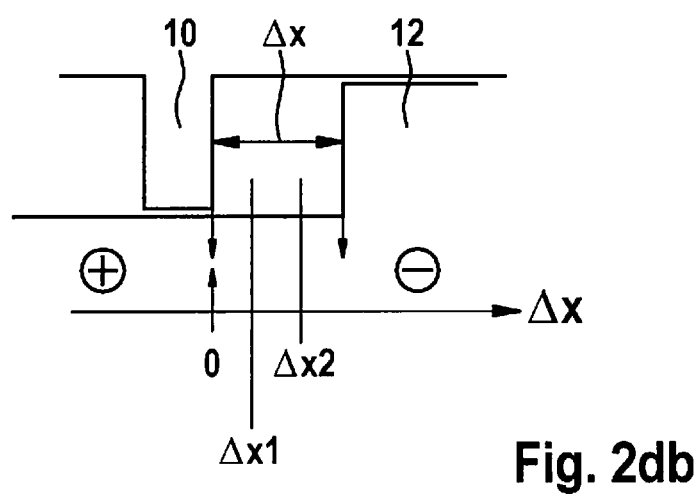

FIGS. 2da and 2db schematically show representations/functional diagrams of the electromechanical brake booster at the end of intermediate phase $P_{int}$. Motor force $F_m$ and pressure force $F_g$ (present at a main brake cylinder pressure $p_{TMC}$ of 40 bar) corresponds to driver braking force $F_d$ of the driver in such a way that the previous deformation of reaction disk 16 of the electromechanical brake booster from first phase P1 is eliminated (see FIGS. 2ca and 2cb). Thus, as of the implementation of intermediate phase $P_{int}$, it is again possible to utilize the input rod travel ascertained on the input rod 10 for detecting/determining an instantaneous request of a (non-zero) setpoint vehicle deceleration by the driver.

Second phase P2 of the emergency braking and/or panic braking is started once main brake cylinder pressure $p_{TMC}$ is equal to the predefined or established setpoint pressure and motor force $F_m$ of the motor of the electromechanical brake booster corresponds to the predefined or established setpoint force. The "unmeasured" deceleration of the vehicle carried out in first phase P1 is ended in second phase P2 of the emergency braking and/or panic braking. The brake pressure increase in the at least one wheel brake cylinder is continued during second phase P2 only if the driver (actually) requests instantaneously a (non-zero) setpoint vehicle deceleration. If necessary, i.e., if the driver (actually) requests instantaneously a (non-zero) setpoint vehicle deceleration, the brake pressure increase in the at least one wheel brake cylinder is continued during the second phase using the at least one pump. Otherwise, a brake pressure reduction can be started in the at least one wheel brake cylinder. In this way, it is automatically ensured that a behavior/a driving manner of the vehicle during second phase P2 corresponds to a criticality of the present situation detected/estimated by the driver.

Second phase P2 of the emergency braking and/or panic braking can thus be referred to as a measuring phase. The (non-zero) setpoint vehicle deceleration requested instantaneously by the driver is taken into consideration at the earliest during second phase P2 of the emergency braking and/or panic braking. Optionally, the (non-zero) setpoint vehicle deceleration requested instantaneously by the driver can be taken into consideration during second phase P2 when decelerating the vehicle by activating the at least one pump of the braking system during second phase P2, while taking the instantaneously requested setpoint vehicle deceleration into consideration. The at least one pump of the braking system can be operated, in particular, during second phase P2 in such a way that the vehicle is decelerated during second phase P2 with a deceleration according to the instantaneously requested setpoint vehicle deceleration or to a function of the instantaneously requested setpoint vehicle deceleration, until second phase P2 is ended at a point in time t3. (During second phase P2, it is possible to adapt brake pressure p in the at least one wheel brake cylinder using the at least one pump in such a way that the brake pressure p in the at least one wheel brake cylinder effectuates the deceleration of the vehicle according to the instantaneously requested setpoint vehicle deceleration or to a function of the instantaneously requested setpoint vehicle deceleration.)

Second phase P2 of the emergency braking and/or panic braking places lower demands on a dynamic of the at least one pump of the braking system. Thus, a use of the electromechanical brake booster for increasing the pressure in the at least one wheel brake cylinder of the braking system can be easily dispensed with.

During second phase P2 of the emergency braking and/or panic braking, it is ascertained whether the driver (actually) requests instantaneously a (non-zero) setpoint vehicle deceleration by ascertaining the input rod travel of input rod 10 of the electromechanical brake booster and/or differential travel Δx between input rod 10 and valve body 12. Thus, a consideration of the criticality of the present situation detected/estimated by the driver is reliably possible. The electromechanical brake booster is preferably operated during second phase P2 of the emergency braking and/or panic braking preferably in such a way that differential travel Δx between input rod 10 and valve body 12 is set equal to the predefined setpoint differential travel using the electromechanical brake booster. Thus, the driver quickly has a standard/familiar pedal feeling during second phase P2 when actuating the brake pedal of his/her vehicle.

Figure 3:
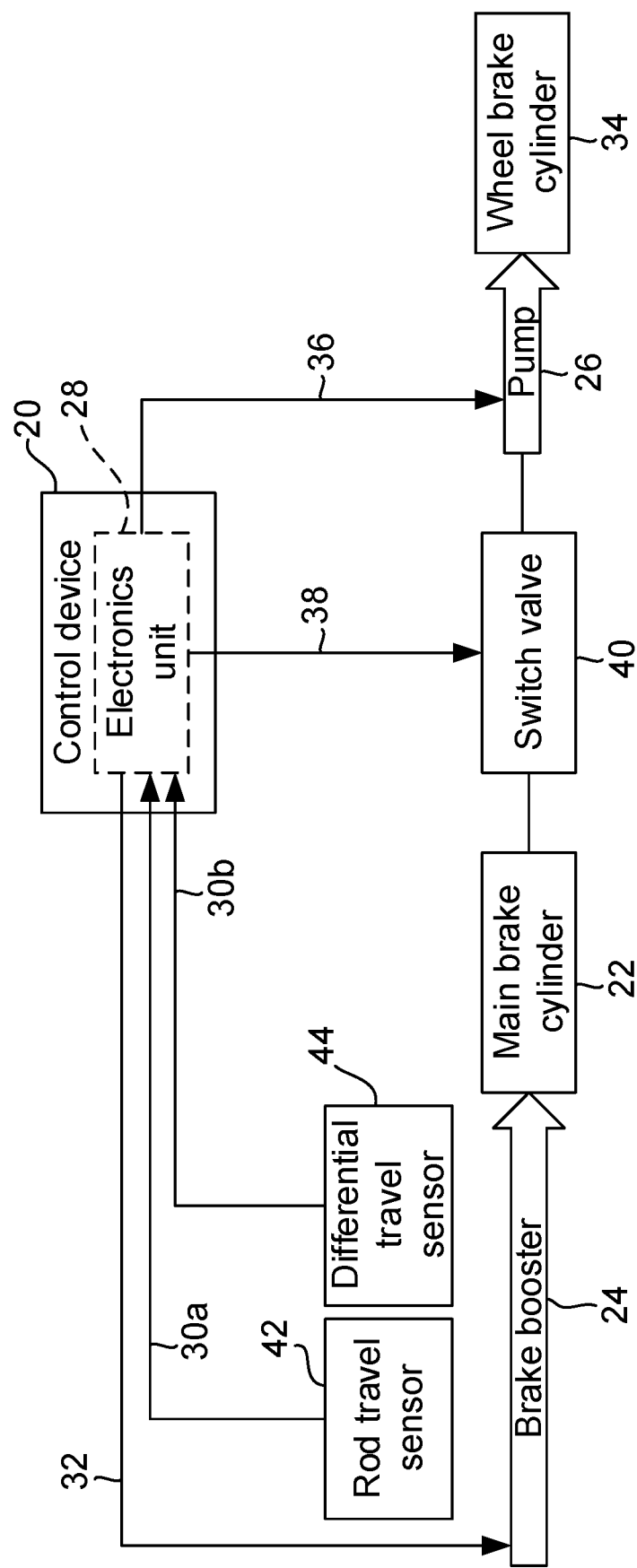
FIG. 3 schematically shows a representation of a braking system of a vehicle including a control device, according to an example embodiment of the present invention.

FIG. 3 schematically shows a representation of an example embodiment of the control device, and of a braking system of a vehicle equipped with the control device.

Control device 20 depicted in FIG. 3 is usable for any braking system that is equipped with an electromechanical brake booster 24 (upstream from a main brake cylinder 22 of its braking system) and at least one pump/hydraulic pump 26. Control device 20 also has no requirements of any kind with respect to a vehicle type/motor vehicle type.

Control device 20 includes an electronics unit 28 designed to activate electromechanical brake booster 24 and/or the at least one pump 26 of the braking system while taking into consideration at least one sensor signal 30a and 30b provided to electronics unit 28 with respect to a setpoint vehicle deceleration requested instantaneously by a driver. An emergency braking and/or panic braking of the vehicle is/are triggerable using electronics unit 28, in particular, by designing electronics unit 28 to ignore the at least one sensor signal 30a and 30b during a first phase of the emergency braking and/or panic braking, and (using at least one control signal 32) to activate electromechanical brake booster 24 during the first phase in accordance with a high power mode program of electromechanical brake booster 24 stored on control device 20. This means that a main brake cylinder pressure in main brake cylinder 2 is increasable/is increased using an increased motor force of a motor (not outlined) of activated electromechanical brake booster 24 in such a way that a brake pressure increase can also be effectuated/is also effectuated in at least one wheel brake cylinder 34 of the braking system.

Electronic unit 28 is also designed to activate in an intermediate phase of the emergency braking and/or panic braking the at least one pump 26 after the first phase (using at least one second control signal 36) in such a way that the main brake cylinder pressure is reduceable or reduced to a predefined or established setpoint pressure by pumping brake fluid from main brake cylinder 22 into the at least one wheel brake cylinder 34. This can effectuate an additional brake pressure increase in the at least one wheel brake cylinder 34 of the braking system. In addition, electronics unit 28 is designed to activate electromechanical brake booster 24 (using the at least one first control signal 32) during the intermediate phase in such a way that the motor force of the motor of electromechanical brake booster 24 is reduceable or reduced to a predefined or established setpoint force.

Electronics unit 28 is also designed to continue during a second phase of the emergency braking and/or panic braking the brake pressure increase in the at least one wheel brake cylinder 34 after the intermediate phase only if it is apparent, based on the at least one sensor signal 30$a$ and 30$b$, that the driver (actually) requests instantaneously a (non-zero) setpoint vehicle deceleration. If necessary, i.e., if the driver (actually) requests instantaneously a (non-zero) setpoint vehicle deceleration, electronics unit 28 is designed to activate the at least one pump 26 (using a second control signal 36) during the second phase in such a way that the brake pressure increase is continuable during the second phase in the at least one wheel brake cylinder 34 using the at least one pump 26. Thus, control device 20 also ensures the advantages already described above. As an advantageous refinement, electronics unit 28 can also be designed to output a closing signal 38 to at least one switch valve 40 of the braking system between the first phase and the intermediate phase of the emergency braking and/or panic braking.

Electronics unit 28 can also be designed to ascertain whether the driver (actually) requests instantaneously a (non-zero) setpoint vehicle deceleration by evaluating an input rod travel 30$a$ of an input rod (not outlined) of electromechanical brake booster 24 provided by an input rod travel sensor 42 and/or a differential travel 30$b$ between the input rod and a valve body (not outlined) of the electromechanical brake booster 24 provided by a differential travel sensor 44. The at least one pump 26 can thus be activated during the second phase while taking ascertained input rod travel 30$a$ and/or ascertained differential travel 30$b$ into consideration (using the at least one second control signal 36). In addition, the emergency braking and/or panic braking of electromechanical brake booster 24 can be operated during the second phase (using the at least one first control signal 32) in such a way that differential travel 30$b$ between the input rod and the valve body can be set equal to a predefined setpoint differential travel using electromechanical brake booster 24.

Optionally, electronics unit 28 can be designed to trigger the emergency braking and/or panic braking of the vehicle if it is apparent, based on the at least one sensor signal 30$a$ and 30$b$, that an actuation speed of an actuation of a brake actuation element of the vehicle by the driver is outside a predefined normal value range for specifying the instantaneously requested setpoint vehicle deceleration and/or if a vehicle state sensor system and/or surroundings detection sensor system (not depicted) of the vehicle request(s) the emergency braking and/or panic braking.

The motor of the electromechanical brake booster 24 can, in particular, request its maximum power in according with the high power mode program stored on control device 20. As an alternative or in addition, electronics unit 28 can be designed to also operate the at least one pump 26 during the first phase of the emergency braking and/or panic braking in accordance with a pump mode program stored on control device 20, so that an additional brake pressure increase can be effectuated/is effectuated in the at least one wheel brake cylinder 34 using the at least one operated pump 26.

In an example embodiment (not depicted), the electronics unit 28 is designed to maintain the first phase of the emergency braking and/or panic braking (only) until an output rod travel signal provided to electronics unit 28 is greater than or equal to a predefined maximum output rod travel signal, until at least one brake pressure signal (of at least one brake pressure sensor not outlined) provided to electronics unit 28 is greater than or equal to at least one maximum brake pressure signal stored on electronics unit 28, until at least one main brake cylinder pressure signal (of at least one primary pressure sensor not outlined) provided to electronics unit 28 is greater than or equal to at least one maximum main brake cylinder pressure signal stored on electronics unit 28, until a deceleration signal of at least one vehicle deceleration sensor not outlined or derived from at least one wheel rotation speed sensor provided to electronics unit 28 is greater than or equal to a maximum deceleration signal stored on electronics unit 28, or until a predefined maximum time of the first phase is exceeded.

What is claimed is:

1. A method for carrying out a braking of a vehicle using a braking system of the vehicle that includes at least one wheel brake cylinder, a main brake cylinder, a pump, and an electromechanical brake booster that is upstream from the main brake cylinder and that is operated using a motor, the method comprising, in response to a braking trigger event:
   during a first phase, controlling a brake pressure in the at least one wheel brake cylinder without regard to a value of any setpoint vehicle deceleration requested by a driver of the vehicle during the first phase, wherein the controlling includes operating the motor in a high power mode in which the motor produces a motor force that causes the electromechanical brake booster to increase a main brake cylinder pressure in the main brake cylinder, which increases the brake pressure in the at least one wheel brake cylinder;
   during an intermediate phase following the first phase, and without regard to a value of any setpoint vehicle deceleration requested by the driver during the first and intermediate phases:
      reducing the main brake cylinder pressure to a setpoint pressure by the pump pumping brake fluid from the main brake cylinder into the at least one wheel brake cylinder; and
      reducing the motor force of the motor to a setpoint force; and
   during a second phase following the intermediate phase, in response to presence of a setpoint vehicle deceleration requested by the driver during the second phase, increasing the brake pressure in the at least one wheel brake cylinder according to a value of the setpoint vehicle deceleration requested by the driver during the second phase.

2. The method of claim 1, wherein the increase of the brake pressure in the at least one wheel brake cylinder during the second phase is performed using the pump.

3. The method of claim 1, wherein the method is performed by executing an algorithm that defines that, during the second phase, the brake pressure is not controlled to be increased in absence of any setpoint vehicle deceleration requested by the driver during the second phase.

4. The method of claim 1, further comprising determining the presence of the setpoint vehicle deceleration requested by the driver during the second phase by ascertaining an input rod travel of an input rod of the electromechanical brake booster and/or a differential travel between the input rod and a valve body of the electromechanical brake booster.

5. The method of claim 4, wherein the electromechanical brake booster is operated during the second phase to set the differential travel between the input rod and the valve body equal to a predefined setpoint differential travel.

6. The method of claim 1, further comprising closing at least one switch valve of the braking system between the first phase and the intermediate phase.

7. The method of claim 1, further comprising operating the pump during the first phase in a pumping mode predefined for the first phase to thereby generate an additional brake pressure increase in the at least one wheel brake cylinder.

8. The method of claim 1, further comprising establishing a main brake cylinder pressure present in the main brake cylinder immediately before the braking as a setpoint pressure to which to increase the main brake cylinder pressure in the first phase.

9. The method of claim 1, further comprising establishing a motor force of the motor immediately before the braking as a setpoint motor force at which the motor is controlled during the first phase.

10. The method of claim 1, wherein, during the first phase, the motor is controlled to operate at a maximum power at which the motor can be operated.

11. The method of claim 1, wherein the first phase lasts until:
an output rod travel of an output rod of the electromechanical brake booster is at least a predefined maximum output rod travel;
at least one brake pressure in the at least one wheel brake cylinder is at least a predefined maximum brake pressure;
the main brake cylinder pressure in the main brake cylinder is at least a predefined maximum main brake cylinder pressure;
a deceleration of the vehicle is at least a predefined maximum deceleration; or
a predefined maximum time of the first phase is exceeded.

12. The method of claim 1, wherein the braking trigger event is an actuation speed of an actuation of a brake actuation element of the vehicle by the driver is outside a predefined normal value range for specifying an instantaneously requested setpoint vehicle deceleration.

13. The method of claim 1, wherein the braking trigger event is a request for an emergency braking by a vehicle state sensor system of the vehicle and/or a surroundings detection sensor system of the vehicle.

14. A control device comprising a storage and a processor, wherein the processor is configured to perform a method of braking a vehicle using a braking system of the vehicle, the braking system including at least one wheel brake cylinder, a main brake cylinder, a pump, and an electromechanical brake booster that is upstream from the main brake cylinder and that is operated using a motor, the method comprising, in response to a braking trigger event:
during a first phase, controlling a brake pressure in the at least one wheel brake cylinder without regard to a value, indicated by at least one sensor signal provided to the processor, of any setpoint vehicle deceleration requested by a driver of the vehicle during the first phase, wherein the controlling includes operating the motor according to a high power mode program, which is stored on the storage, in which the motor produces a motor force that causes the electromechanical brake booster to increase a main brake cylinder pressure in the main brake cylinder, which increases the brake pressure in the at least one wheel brake cylinder;
during an intermediate phase following the first phase, and without regard to a value, indicated by at least one sensor signal provided to the processor, of any setpoint vehicle deceleration requested by the driver during the first and intermediate phases:
reducing the main brake cylinder pressure to a setpoint pressure by controlling the pump to pump brake fluid from the main brake cylinder into the at least one wheel brake cylinder; and
reducing the motor force of the motor to a setpoint force; and
during a second phase following the intermediate phase, in response to and conditional upon presence of a setpoint vehicle deceleration requested by the driver during the second phase, increasing the brake pressure in the at least one wheel brake cylinder according to a value, indicated by at least one sensor signal provided to the processor, of the setpoint vehicle deceleration requested by the driver during the second phase.

15. A braking system for a vehicle comprising:
at least one wheel brake cylinder;
a main brake cylinder;
a pump;
an electromechanical brake booster that is upstream from the main brake cylinder and that is operated using a motor; and
a control device that includes a storage and a processor, wherein the processor is configured to perform a method of braking the vehicle, the method comprising, in response to a braking trigger event:
during a first phase, controlling a brake pressure in the at least one wheel brake cylinder without regard to a value, indicated by at least one sensor signal provided to the processor, of any setpoint vehicle deceleration requested by a driver of the vehicle during the first phase, wherein the controlling includes operating the motor according to a high power mode program, which is stored on the storage, in which the motor produces a motor force that causes the electromechanical brake booster to increase a main brake cylinder pressure in the main brake cylinder, which increases the brake pressure in the at least one wheel brake cylinder;
during an intermediate phase following the first phase, and without regard to a value, indicated by at least one sensor signal provided to the processor, of any setpoint vehicle deceleration requested by the driver during the first and intermediate phases:
reducing the main brake cylinder pressure to a setpoint pressure by controlling the pump to pump brake fluid from the main brake cylinder into the at least one wheel brake cylinder; and
reducing the motor force of the motor to a setpoint force; and
during a second phase following the intermediate phase, in response to and conditional upon presence of a setpoint vehicle deceleration requested by the driver during the second phase, increasing the brake pressure in the at least one wheel brake cylinder according to a value, indicated by at least one sensor signal provided to the processor, of the setpoint vehicle deceleration requested by the driver during the second phase.

* * * * *